United States Patent
Ruckman et al.

(10) Patent No.: US 6,967,342 B2
(45) Date of Patent: Nov. 22, 2005

(54) METHOD AND APPARATUS FOR IMPROVED ULTRAVIOLET (UV) TREATMENT OF LARGE THREE-DIMENSIONAL (3D) OBJECTS

(75) Inventors: Mark W. Ruckman, Montgomery Village, MD (US); Miodrag Cekic, Bethesda, MD (US); Jeffery K. Okamitsu, Westminster, MD (US); Hans Daniel Nilsson, London (GB)

(73) Assignee: Fusion UV Systems, Inc., Gaithersburg, MD (US)

( * ) Notice: Subject to any disclaimer, the term of this patent is extended or adjusted under 35 U.S.C. 154(b) by 257 days.

(21) Appl. No.: 10/630,700

(22) Filed: Jul. 31, 2003

(65) Prior Publication Data

US 2005/0023478 A1    Feb. 3, 2005

(51) Int. Cl.[7] .............................................. G01N 21/64
(52) U.S. Cl. ............................ 250/504 R; 250/461.1; 250/467.1
(58) Field of Search .................... 250/504 R, 461.1, 250/467.1

(56) References Cited

U.S. PATENT DOCUMENTS

| | | | |
|---|---|---|---|
| 4,812,957 A * | 3/1989 | Hill | 362/263 |
| 4,839,522 A | 6/1989 | Bourgeois et al. | |
| 5,652,757 A * | 7/1997 | Okazaki et al. | 372/22 |
| 6,166,389 A | 12/2000 | Shie et al. | |
| 6,271,532 B1 | 8/2001 | Trokhan et al. | |
| 6,505,948 B2 * | 1/2003 | Cekic et al. | 362/84 |
| 6,566,660 B1 | 5/2003 | Stowe | |
| 6,649,921 B1 * | 11/2003 | Cekic et al. | 250/504 R |
| 6,887,233 B2 * | 5/2005 | Angeley et al. | 606/17 |

FOREIGN PATENT DOCUMENTS

| | | |
|---|---|---|
| JP | 4-173233 | 6/1992 |
| JP | 5-338042 | 12/1993 |
| JP | 6-305032 | 11/1994 |
| JP | 8-257468 | 10/1996 |

* cited by examiner

Primary Examiner—John R. Lee
Assistant Examiner—Kalimah Fernandez
(74) Attorney, Agent, or Firm—Antonelli, Terry, Stout and Kraus, LLP.

(57) ABSTRACT

The invention is a method of irradiating at least one surface of a three-dimensional object (36, 114) with a desired ultraviolet light irradiance flux produced by an ultraviolet light source (22, 102). The invention determines a position at which the three-dimensional object will be positioned relative to the ultraviolet light source when the at least one surface (35, 113) is to be irradiated with the desired ultraviolet light flux; determines an unmodified ultraviolet light flux which would irradiate the at least one surface when the ultraviolet light source is activated while the three-dimensional object is at the position relative to the ultraviolet light source; produces an optical element (30, 112), based upon the unmodified ultraviolet light flux and the desired ultraviolet light fluxes, which provides a modified wavefront of the ultraviolet light flux to irradiate the at least one surface with the desired ultraviolet light flux; positions the optical element in the path which the wavefront of the ultraviolet light from the ultraviolet light source would follow in irradiating the at least one surface; and activates the ultraviolet light source to image transmit the ultraviolet light flux from the ultraviolet light source on to the optical element to cause irradiation of the at least one surface with the desired light flux.

41 Claims, 8 Drawing Sheets

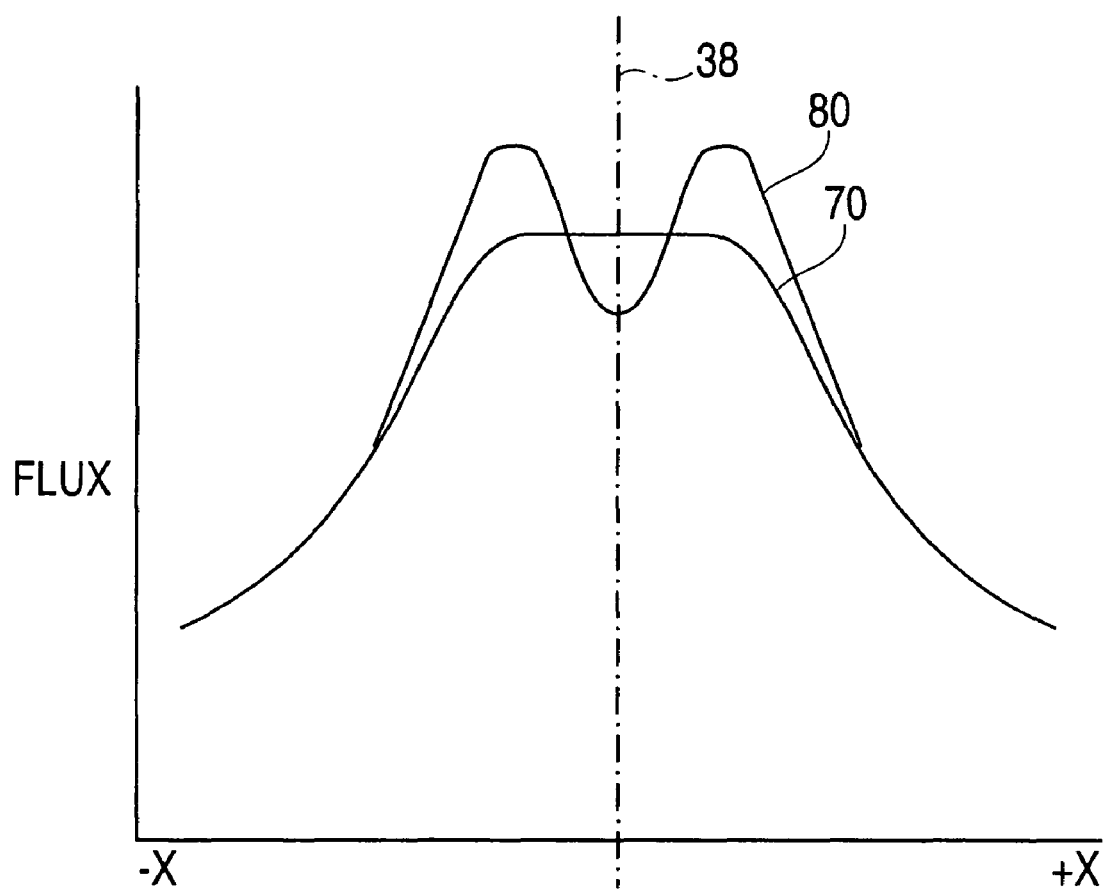

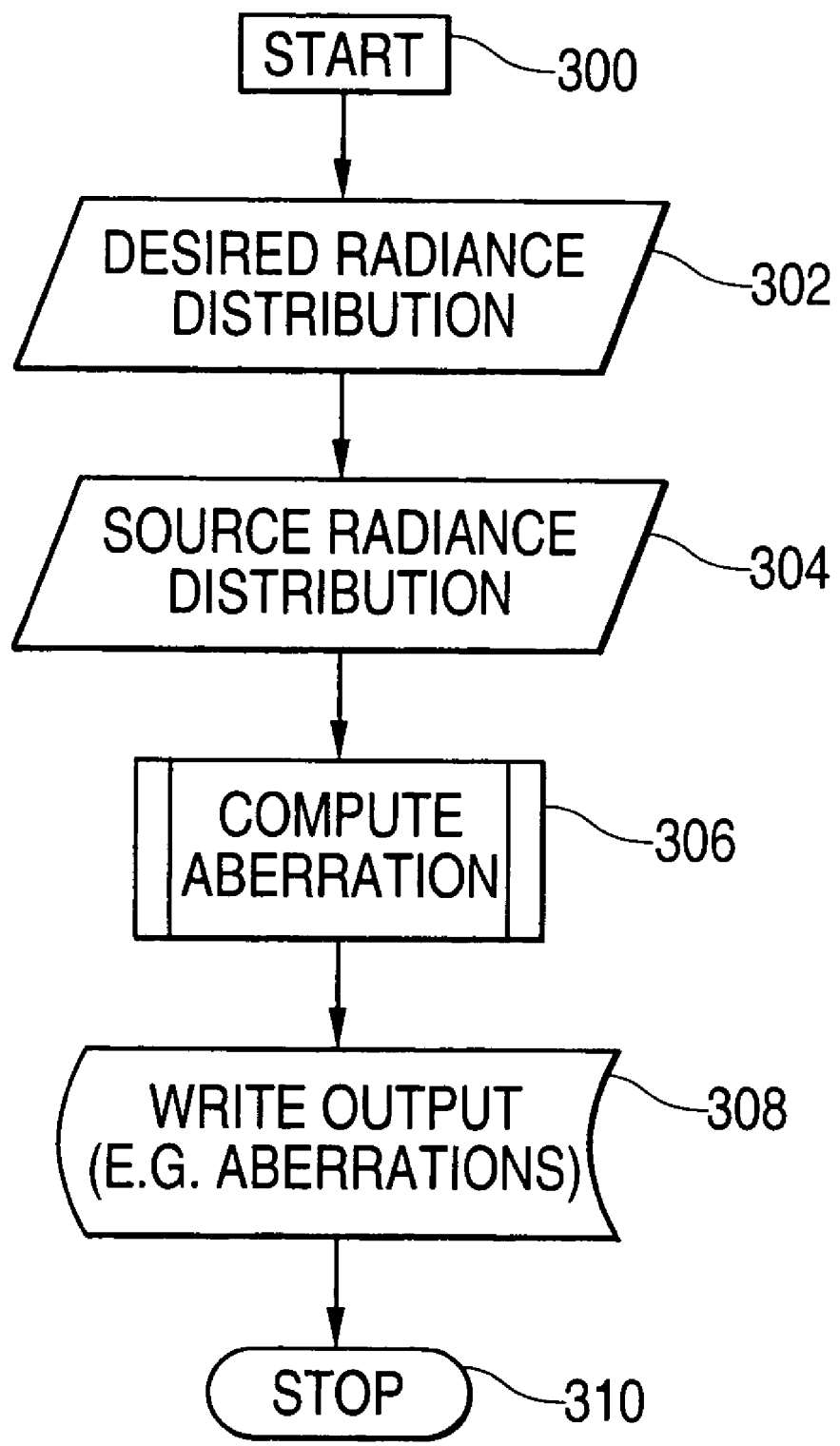

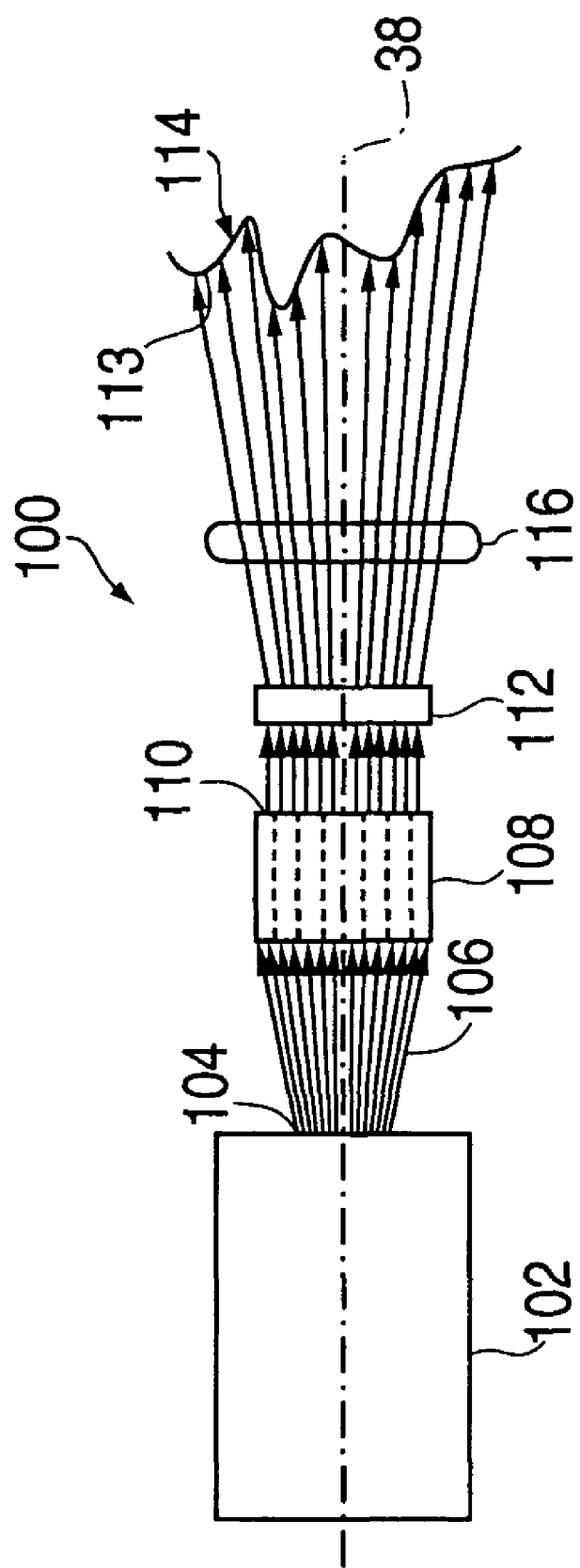

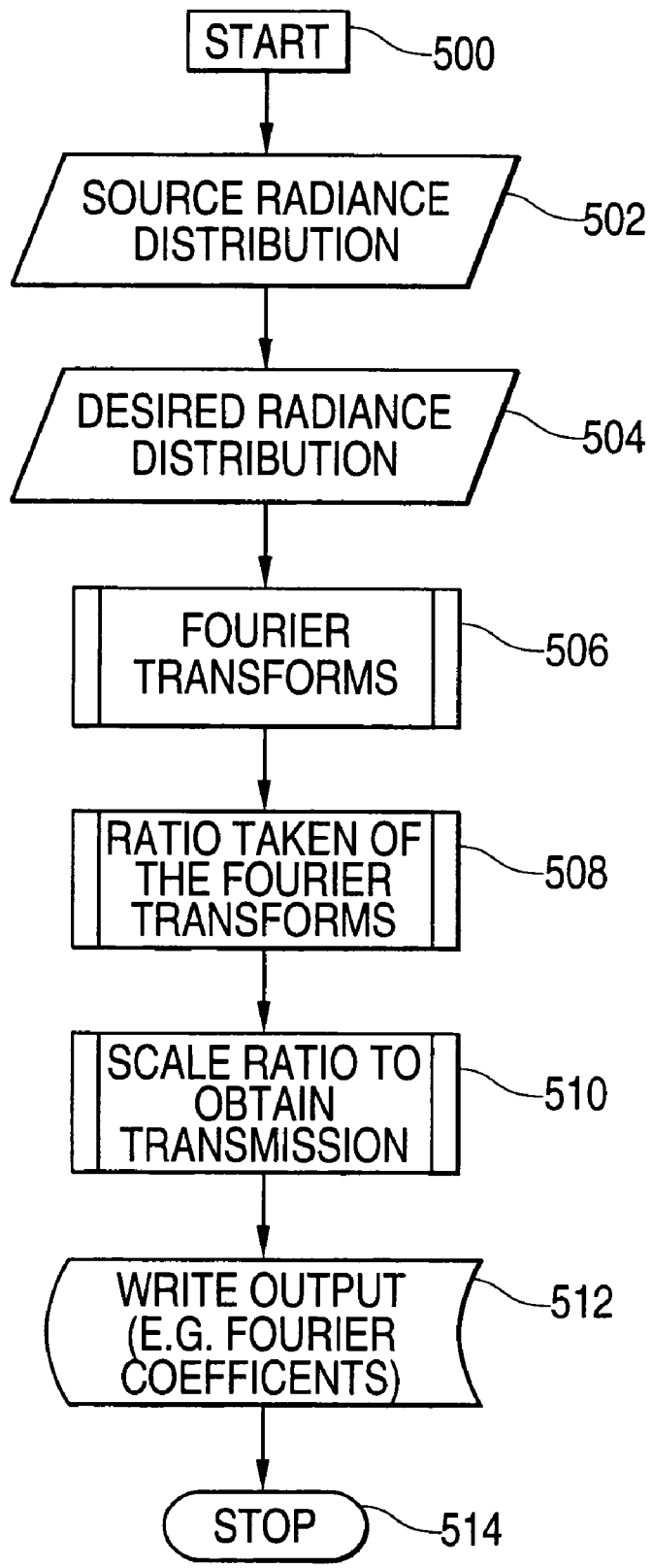

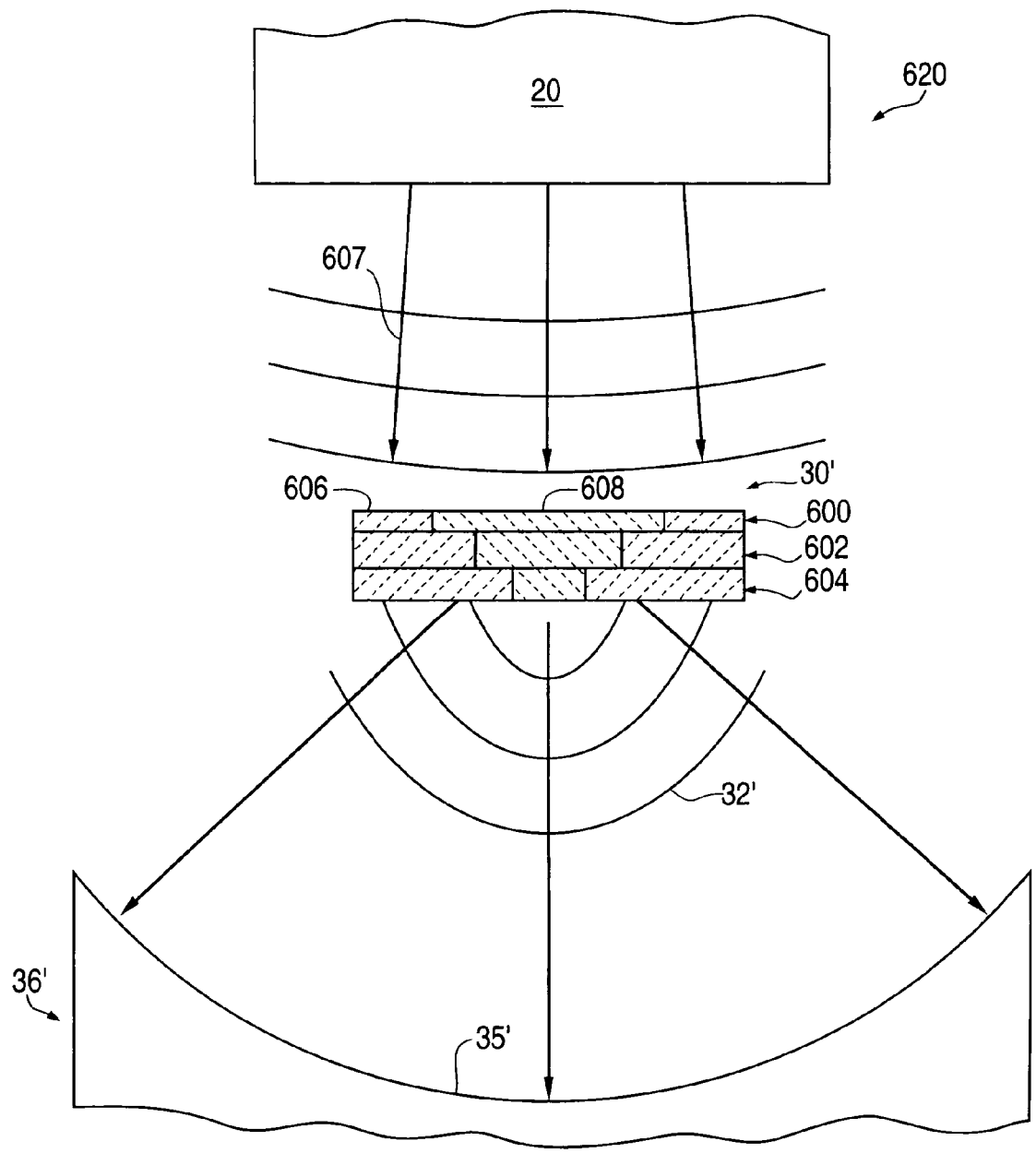

METHOD AND APPARATUS FOR IMPROVED ULTRAVIOLET (UV) TREATMENT OF LARGE THREE-DIMENSIONAL (3D) OBJECTS

BACKGROUND OF THE INVENTION

1. Field of the Invention

The present invention pertains to a method providing substantially improved irradiation of large areas of three-dimensional (3D) objects. More particularly, the present invention pertains to a method of projecting a high level of light flux in a non-uniform pattern onto a three-dimensional target surface so as to more uniformly treat the surface.

2. Description of the Prior Art

Various manufacturing processes include treating 3D surfaces by illuminating surfaces with radiant energy, for example, ultraviolet light or irradiation of surfaces by particle beams, for example, electron beams. The radiation treatment may be related to curing, polymerization, oxidation, purification, disinfections, or some other procedure. By way of example, the manufacture of wood components for furniture involves the application of a clear coating onto the surface of the component for the purpose of surface protection and improvement of the appearance of the wood surface. The clear coats are resins or polymer-based materials that are applied as liquids and require heating or other processing to become solids. The curing of clear coatings by thermal treatment is not instantaneous and usually requires times ranging from minutes to hours. Non-thermal curing using radiant energy to polymerize the clear coat is rapid in comparison to thermal treatment. This speed is achieved because the energetic beam that causes the needed chemical change the moment it is applied to the surface. Obtaining a high quality, uniform product requires irradiating the surface with a uniform high level of radiation energy flow rate (flux) that meets or exceeds processing parameters over the entire target area. Otherwise, irregularities in the finished product will result.

Existing devices for irradiation or illumination usually produce a high level of irradiance or illuminance within a narrow depth-of-field with respect to the radiation source. This limits existing radiation sources to the treatment of three-dimensional objects that are smaller than the depth-of-field when a uniform irradiation of product is required.

The treatment of 3D objects that are larger than the depth-of-field of the radiation source requires a means of controlling the uniformity of the net spectral irradiance, $I_\lambda$. $I_\lambda$ is related to the net surface spectral radiance $F_\lambda$. $F_\lambda$ is defined as the energy outflow rate (radiant light flux) in the space angle $d\Omega$ per unit surface area of the source within a small wavelength range $\lambda$ to $\lambda+d\lambda$ $$F_\lambda = \delta^4 E / \delta A \delta t \delta \Omega \delta \lambda \, (W.m^{-2}.sr^{-1}nm^{-1})$$

The net spectral irradiance $I_\lambda$ is related to the net surface spectral radiance, $F_\lambda$, by considering the directional dependence of the energy flow rate (flux) striking the surface. The net spectral irradiance $I_\lambda$ is defined by:

$$I_\lambda = \delta^4 E / \cos\theta \delta A \delta t \delta \Omega \delta \lambda \, (W.m^{-2}sr^{-1}nm^{-1})$$

wherein $I_\lambda$ is a subset of energy flow rate (flux) in the wavelength interval $(\lambda, \lambda+d_{\lambda 2})$, flowing toward the targeted 3D surface element $\delta A$ (with a unit normal n) within a solid angle $\delta\Omega$. The angle $\theta$ is the angle between the normal of the surface element and the direction of the incident light beam. The irradiance is a projection of the radiance onto the surface, and for the case of a light beam from an isotropic point source is a function of the shape of the surface if that surface differs from that of a sphere centered on the source.

Actual light sources are non-isotropic and spatially extended. In general, 3D objects have arbitrary shapes where the direction of the surface normal varies in a complex fashion. To achieve uniformity of the radiance for a 3D object requires either a complex light beam resulting in irradiance that varies in a point-by-point manner over the object, or a complex sequence of motions of the light source, 3D object, or both, the light source and 3D object which averages the irradiance over the angular space of the 3D object or light beam.

Various techniques have been used to control the irradiance from a single radiation source over the surface of 3D objects. The techniques are also known regarding illumination where the same techniques are used to improve the performance of visible lighting systems for a number of purposes.

U.S. Pat. No. 4,839,522 discloses an ultraviolet light treatment system that uses transmission through a translucent material or diffuser to induce multiple scattering that randomizes the direction of light rays. When integrated over any point on the surface this randomization reduces the variation in the energy or power impinging on a surface element. A drawback inherent in this approach is that multiple scattering increases the path length of a ray in the translucent material and its absorption. Such systems may be inefficient given that energy is removed from the treatment beam. The absorption of energy in the diffuser may lead to excessive heating of the optics and a need to provide active or passive cooling devices to prevent damage to the optics or any adjacent component of the treatment system. Finally, energy absorption may damage the optical system in ways unrelated to purely thermal effects.

The treatment beam can also be modified to improve its coupling to 3D surfaces by breaking the beam into smaller sub-beams or beamlets. The beamlets can be directed onto a point on the surface to provide a spread of angles or by superposition to increase the flux. U.S. Pat. No. 6,271,532 is illustrative of the use of a facetted optical element to break a beam into beamlets. With the '532 patent a mirrored surface is dimpled to create an array of facets that have variable focal lengths. This modifies the depth of focus by increasing it. U.S. Pat. No. 6,166,389 employs an approach where a sol-gel generated film is selectively applied to a transparent optical element like a lens to scatter light in a specific direction to modify a beam profile. Depending on the optical element, radiant energy can be lost through absorption or scattering. Modification of optical components to increase beam divergence or randomness can reduce the original performance of the optical component.

3D objects can be made into 2D objects by slicing, sectioning or projection. Japanese Kokei JP-4-173233 shows that projecting a series of appropriate 2D images on a resin can create 3D shapes. In the preferred embodiment, a narrow beam is traced into the resin and draws the desired 2D pattern of the appropriate slice. By fabricating a series of slices a 3D object is created. The same technique can be used to scan a beam over a 3D object or to project a series of patterns that happen to irradiate all parts of a 3D object. A significant limitation of this technique is the requirement that no part of the 3D object blocks the incident beam. If this occurs, then parts of the 3D object will not receive the beneficial treatment provided by the radiant energy.

The limitation of Japanese Kokei JP-4-173233 can be overcome by the approaches embodied in Japanese Kokei JP-5-338042 that teaches the use of multiple lamps or energetic beam sources placed around a 3D object to direct light beams onto every part of the treatment object. The lamps or energetic beam sources can be placed at specific locations to control the irradiance or dose over all parts of the object. The '042 Kokei also reveals the use of arrays of mirrors to split the beam from a single light source into multiple beams that are directed in a controlled manner to accomplish the same function as an array of multiple light or energy beam sources. This approach to 3D curing increases the cost of the curing system by increasing the number of curing beam sources or the number of optical components like lenses, mirrors or optical fibers.

Japanese Kokei JP-8-257468 and U.S. Pat. No. 6,566,660 disclose radiation or energetic beam sources attached to a mechanical device with numerous degrees of freedom to permit the energy sources to be moved in a controlled motion over a 3D object to control the irradiance or energy dose. The energetic source can be held in a fixed position and the treatment object moved in a manner that allows the treatment beam to be scanned over all parts of a 3D object.

Japanese Kokei JP-5-338042 teaches the use of a turntable to move a 3D object during curing to improve the irradiance profile over a 3D object and to ensure that surfaces facing away from an energy source also receive exposure to an energetic beam. While an effective method for improved treatment of 3D objects, there is an increased cost for the mechanical components needed to move the treatment beam source.

The use of holograms to fabricate 3D objects from resins is described in Japanese Kokei JP-6-305032. Lasers are used to irradiate the holographic elements and project the light patterns necessary to treat the resins and make 3D parts. This technique is similar that disclosed in Japanese Kokei JP-4-173233 which teaches the use of a series of two-dimensional projections to construct a 3D part. Kokei JP-6-305032 uses a 3D projection to create a part during an exposure. A drawback in the holographic technique is the requirement to use a coherent radiation source or laser. Lasers are very inefficient in the conversion of electrical energy into radiant energy and have a small aperture and narrow beam. The latter limitation makes it hard to project a laser beam over a large solid angle.

SUMMARY OF THE INVENTION

The invention is an improved method and apparatus for curing layers coated on a large three-dimensional substrate.

The invention is an improved method and apparatus for treating the surfaces of large three-dimensional substrates.

The invention is an improved method and apparatus for the oxidation of the surfaces of large three-dimensional substrates.

The invention is an improved method and apparatus for oxidizing layers coated on large three-dimensional substrates.

The invention is an improved method and apparatus for the disinfection of the surfaces of large three-dimensional substrates.

The invention is an improved method and apparatus for decontamination of the surfaces of large three-dimensional substrates.

The invention eliminates the need for the superposition of more than one light source to provide a specific surface irradiance distribution required for a specific three-dimensional substrate to perform the above methods.

The invention eliminates the need for the prior art mechanical systems, which rotate, articulate or translate one or more light sources to average the surface irradiance distribution over a specific three-dimensional substrate.

The invention eliminates the need for the prior art mechanical systems which rotate, articulate or translate three-dimensional objects in the light beam of one or more one light sources to average the irradiance distribution over a specific three-dimensional substrate.

According to the first aspect of the invention, a transmissive or reflective optical element is placed into the output beam of a treatment lamp, which is preferably a UV lamp. The transmissive or reflective optical element modifies the profile of the output beam in the far field so that the irradiance of or light flux striking at least one three-dimensional surface is made substantially more uniform and desirably as uniform as possible. The transmissive or reflective optical element can modify the output beam profile by introducing changes in or aberrations in a direction of the wavefront of the output beam on a point-by-point basis along one or more parts of the wavefront so that the irradiance or light flux striking at least one surface of a three-dimensional surface is made substantially more uniform. The type and degree of the changes or aberrations are chosen to satisfy the criterion that the direction of a normal to the wavefront is parallel to the surface normal of the three-dimensional object on a point-by-point basis.

According to a second aspect of the invention, a least one transmissive or reflective holographic element modifies the output beam profile by introducing changes in the phase of more than one wavefront on a point-by-point basis along one or more parts of the wavefront. The phase changes are chosen to vary the shape of the wavefront so that the shape of the wavefront and the shape of the surface of the three-dimensional are substantially similar. This similarity makes the direction of the beam and the surface normal of the three-dimensional surface more coincident and increases the uniformity of the radiance of the output beam or light flux on a point-by-point basis over at least one surface of the three-dimensional object.

The modified output beam provides better control of the irradiance and/or absorbed energy or light flux during the treatment process.

The invention is a method of irradiating at least one surface of a three-dimensional object with a desired light flux, which in a preferred embodiment is ultraviolet light, produced by a light source. The method includes determining a position at which the three-dimensional object will be positioned relative to the light source when the at least one surface is to be irradiated with the desired light flux; determining an unmodified light flux which would irradiate the at least one surface when the light source is activated while the three-dimensional object is at the position relative to the light source; producing an optical element, based upon the unmodified light flux and the desired light flux, which provides a modified wavefront of the light flux produced by the light source and which optical element, if positioned in a path of the wavefront of the flux to the at least one surface, would cause the modified wavefront to irradiate the at least one surface with the desired light flux; positioning the optical element in the path which the wavefront of the light from the light source would follow in irradiating the at least one surface; and activating the light source to transmit the light flux from the ultraviolet light source to the optical element to cause irradiation of the at least one surface with the desired light flux. The desired light flux may produce a substantially uniform irradiance on the at least one surface.

The irradiation of the at least one surface may oxidize the at least one surface or at least one surface oxidizes at least one layer coated on the at least one surface. The irradiation of the at least one surface may disinfect or decontaminate the at least one surface. The light source may be a plasma discharge lamp providing radiation in a desired wavelength range. The light source may be a non-coherent solid-state diode array providing the desired ultraviolet light flux. The optical element may be a lens that reconfigures the light flux transmitted from the light source to the at least one surface. The optical element may comprise overlapping layers of a lens material with at least two layers having a different index of refraction. The optical element may comprise overlapping layers of a lens material of different thickness and having a different index of refraction. The optical element may be a lens which modifies the light flux produced by the light source and a mirror that reconfigures light flux transmitted by the lens to irradiate the at least one surface with the desired light flux. The optical element may comprise at least one hologram through which the wavefront passes and the at least one light source is non-coherent. The at least one optical element may be at least two holograms through which the wavefront passes and the at least one non-coherent light source radiates two or more wavelengths.

BRIEF DESCRIPTION OF THE DRAWINGS

These and other aspects and advantages of the present invention are more apparent from the following detailed description particularly when considered in conjunction with the accompanying drawings. In the drawings:

FIG. 2 is an illustration of the modification of the treatment beam profile in the plane from –x to x of FIG. 1 needed to make the radiance measured on the three-dimensional target more homogeneous and substantially uniform as shown in FIG. 1.

FIG. 3 is a flow chart of one possible algorithm for computing the shape of the optical element needed for introducing aberrations into the beam with a nature and magnitude which may be quantified by a polynomial expansion of the surface profile, such as an algorithm based on the approaches of Nijboer and Zernike which provide coefficients of the optical element used to modify the intensity distribution of the radiated beam.

FIG. 4 is a schematic view of the second embodiment of an apparatus providing substantially uniform irradiation of a 3D target using at least one holographic optical element for beam modification and a source of ultraviolet energy, which is non-coherent or quasi-coherent.

FIG. 5 is a flow chart showing the iterative Fourier transform algorithm (IFTA) used to compute the diffractive optical element of FIG. 1 or the hologram of FIG. 4 which is one form of a Fourier transform that may be used to transform the function that describes the far field source beam profile into the desired beam profile, which makes the irradiance of at least one surface more uniform and homogenous and desirably as substantially uniform as practical.

FIGS. 6A and 6B are schematic illustrations of further embodiments of the invention with at least one optical element comprised of overlapping layers including segments of different indices of refraction and thickness with FIG. 6A being a transmissive optical element embodiment and FIG. 6B being a reflective optical element embodiment.

Like reference numerals identify like parts through the drawings.

DESCRIPTION OF THE PREFERRED EMBODIMENTS

In the following description of the present invention, reference is made to the accompanying drawings that form a part, hereof, and in which are shown by way of illustration the various embodiments in which the invention may be practiced. It is understood that other embodiments may be utilized, and that structural and functional modifications may be made without departing from the scope of the present invention.

Figure 1:
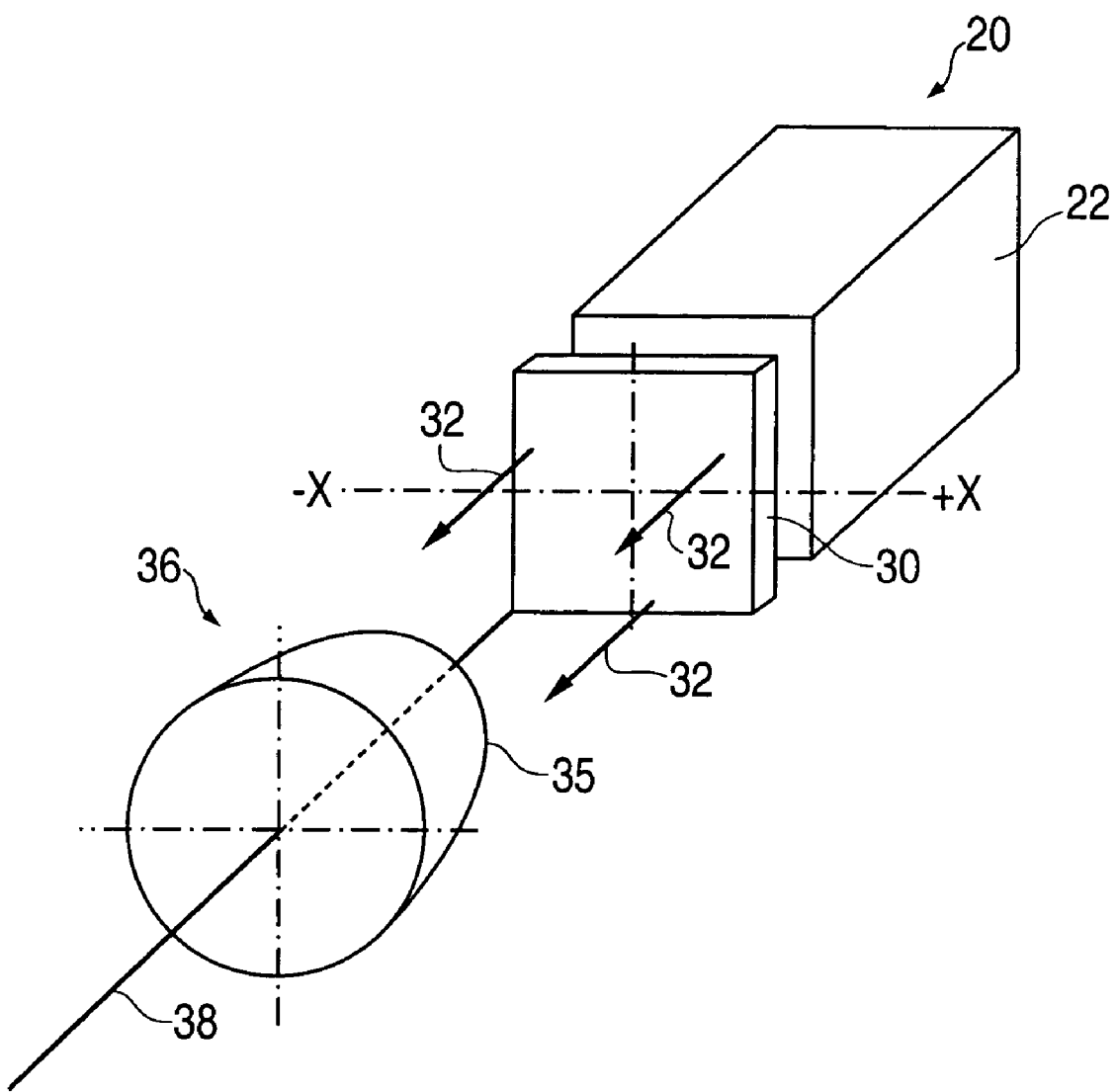
FIG. 1 is a schematic view of the first embodiment of an apparatus in accordance with the invention for providing irradiation of a 3D target including an optical element configured to introduce aberration(s) into the beam for the purpose of ensuring that the irradiance on at least one surface of the 3D target more homogenous and substantially uniform.

FIG. 1 depicts a first embodiment of an irradiation apparatus 20 in accordance with the present invention. The apparatus 20 includes a UV radiation source 22, which is depicted as a rectangular enclosure with a square aperture. The radiation source 22 is a light source such as a source of UV in the preferred embodiments of the invention, and for example may be a plasma discharge lamp (microwave electrodeless discharge lamp, an arc discharge lamp, a fluorescent discharge lamp) constructed or filtered to radiate predominantly in the desired wavelength ranges, such as, for UV, UV-A, UV-B, and UV-C or a non-coherent solid-state diode array which are all represented schematically by radiation source 22. By way of example, the radiation source 22 may be without limitation a hexagonal 40-diode array emitting 400 mW of light such as UV placed at a 1 $cm^2$ square aperture. A high power radiation source 22 may be a ten-inch long six-kilowatt ultraviolet microwave electrodeless discharge bulb placed at the focus in a cylindrical reflector with a parabolic cross section of the type manufactured by the assignee. Light may be emitted, for example, through a rectangular aperture of 265 by 195 mm. The source, 22 reflector (not illustrated) projects a beam that has the cross section 70 along the x-axis shown in FIG. 2.

At least one optical element, which may be a lens or complex-shaped optical plate 30 is placed in the beam 32 projected by the radiation source 22. The at least one optical plate 30 may be made from diverse types of glass or other optically transparent materials in the wavelengths of the light. The at least one complex shaped plate or lens 30 is configured to modify the irradiance profile 80 illustrated in FIG. 2 of the beam 32 to satisfy the condition that the variation in the irradiance between any two points on the at least one surface 36 of the 3D object 35 is minimized. It should be noted that, while the 3D object 35 is shown as having one surface 36, actual applications may have multiple surfaces which define the 3D volume of the object. Moreover, while the at least one complex shaped optical plate or lens 30 is illustrated as a flat plate, in actual applications, the at least one optical element may have diverse designs, such as overlapping layers of a variable index of refraction material, overlapping layers of a lens material of different thickness and having at least two refractive indices, a lens which modifies the light flux produced by the light source and a mirror that reconfigures light flux transmitted by lens to irradiate the at least one surface with the desired light flux or a lens or lens material bonded to at least one mirror as described below in conjunction with the further embodiments of FIGS. 6B and 7. The irradiance is a projection of the radiance of the beam 32 onto the at least one surface 35 of the 3D object 36. For the case of a light beam from an isotropic UV point source 22, the irradiance is a function of the shape of the surface, if that surface differs from that of a sphere centered on the light source 22. In accordance with the present invention, the light source 22 projects a collimated beam whose wavefronts can be approximated by an array of planar wavefronts. The irradiance is the projection of the shape of the object onto a plane perpendicular to the optical axis 38 defined by the light source 22, the at least one complex-shaped plate or lens 30 and the 3D object 36. In accordance with the present invention, the planar wavefronts produced by the light source 22 are modified into complex wavefronts by the at least one complex shaped plate or lens 30 whose projection onto the 3D object 36 results in a smaller variation in the irradiance between any two points on the at least one surface 35 of the 3D object than that which would occur without any optical element 30 and ideally produces a substantially uniform as possible variation in the irradiance.

The at least one complex-shaped plate 30 is configured to introduce aberration(s) into the treatment beam 32 and change the intensity distribution of the light flux to produce a more homogeneous irradiance on the at least one surface 35 of the 3D object 36 than that which would be achieved if the optical element 30 was not used. In most applications, the objective is to produce as uniform as possible light flux or irradiance which strikes the normal to each point on the at least one surface 35.

The at least one surface 35 may be irradiated to provide diverse types of light treatment thereto. For example, the at least one surface 35 may be oxidized by the irradiation 32, a surface coating on the at least one surface may be cured or oxidized by the irradiation or the at least one surface may be decontaminated or disinfected to remove harmful pathogens.

The required at least one optical element 30 may be configured using empirical processes, such as ray tracing, well known in the art of lens manufacture or may be computed using the nature and magnitude of coefficients as explained below which are used to manufacture the at least one optical element.

FIG. 3 illustrates an example of one possible algorithm for computing the nature and magnitude of the aberrations which are required to be produced to produce the desired irradiance/light flux on the at least one surface 35 using the well-known theory of aberrations as described, for example, by F. Zernike, Physica 689 (1934, B. R. A. Nijboer Physica 10, 679 (1943) or F. Zernike and B. R. A. Nijboer, Revue d'Optique (1949) which publications are incorporated herein by reference in their entirety or any other known method of computing polynomials or other known techniques for designing optical elements to provide for a desired aberration(s). The aberrations are variations in the shape of wavefronts and in accordance with the present invention, there exists at least one complex wavefront that modifies the beam cross section 70 of FIG. 2 to provide a modified beam cross section 80 representing flux as a function of the distance from the optical axis 38. The result is a smaller variation in the irradiance between any two points on the at least one surface 35 of the 3D object 36 and most desirably, a substantially uniform irradiance. Zernike and Nijboer-type polynomials in the prior art are related to well-known variations in the shape of images in optical systems and are used to design corrective optics to reduce the distortions encountered in imaging systems that are not paraxial, but these polynomials may also be used to introduce deliberate aberrations as utilized by the invention. In accordance with the present invention, the at least one optical element 30 changes the direction of the wavefront represented by beams 32 while the wavefront passes through the at least one optical element that changes the wavefront shape. The treatment beam is modified so that, for example, for the at least one surface 35 of FIG. 1, the treatment beam's cross section changes from curve 70 to curve 80 in FIG. 2.

The process of computing the shape of the at least one complex-shaped plate 3 is described in FIG. 3. The algorithm is entered at the point 300 labeled "Start". The algorithm of the first embodiment of the present invention computes the coefficients of a polynomial expansion that characterize the desired aberrations to produce a corrected wavefront such as that represented by curve 80 in FIG. 2. The values of these coefficients are used in designing the at least one optical element represented by the at least one complex-shaped plate or lens 30. The process proceeds from starting point 300 to point 302 where the desired Radiance Distribution is entered into the algorithm. In the preferred embodiment the desired Radiance Distribution is defined as a numerical or analog (functional) description of the radiance of the 3D target 36 needed to achieve process requirements. It is the numerical or analog description of the radiation beam 80 that will when projected on the 3D object 36 to produce the wanted irradiance. In the present embodiment, the desired Radiance Distribution is a data set that consists of a sequence of manually chosen radiance values assigned to the individual elements of a meshed representation of the 3D object 36. The process proceeds from point 302 to point 304 where a second required data set defined as a numerical or analog (functional) description of the treatment beam called the Source Radiant Distribution is entered into the algorithm. The Source Radiant Distribution, illustrated by curve 70 in FIG. 2, describes the power or energy density of the radiation beam 32 projected by the radiation source 22 with the x and y coordinates of the beam being perpendicular to the direction of propagation along the z-axis 38 of FIG. 1. The Source Radiant Distribution and the Desired Radiant Distribution are used to compute the needed aberration coefficients. This calculation is done at point 306 labeled "Compute Aberration". The Source Radiant Distribution 70 characterizes the initial radiation beam profile or "initial state" while the Desired Radiant Distribution 80 characterizes the modified radiation beam profile or "final state". The modification of the beam profile is done by an operator which transforms the initial state into the final state. The operator is a function that is expanded into a polynomial series whose coefficients are related to the magnitude of optical aberrations known to those skilled in the art. In the preferred embodiment, polynomials introduced by Zernike and Nijboer are used to expand the operator. The equation is inverted to estimate the coefficients (i.e. to determine the magnitude of various aberrations needed to transform the initial state into the final state) at point 308 with the aberrations being written as an output. After the Zernike coefficients are computed at point 308 (which represents writing of the output files defining the desired at least one optical element 32), the process proceeds to stopping the program at stop point 310. Thereafter, the output files are used to produce the actual at least one optical element 32 which produces the desired aberration(s). The preferred embodiment uses the diffractive optical methods advanced by Zernike and Zernike and Nijboer to characterize the aberrations. It is understood that other methods for characterizing optical aberrations like the geometrical optical method of Seidel can be used to specify the needed aberrations. It is also understood that iterative algorithms can be used to determine the desired Radiance Distribution and the associated aberrations, thereof.

FIG. 4 depicts a second embodiment 100 of an irradiation apparatus in accordance with the present invention. The apparatus includes a radiation source 102, which is depicted for purposes of one possible representation as a rectangular enclosure with a square aperture. The radiation source 102 preferably is, as discussed above with reference to FIG. 1, a light source such as a source of UV, and for example might be a plasma discharge lamp (microwave electrodeless discharge lamp, an arc discharge lamp, a fluorescent discharge lamp), constructed or filtered to radiate ultraviolet radiation predominantly in the desired UV wavelength ranges UV-A, UV-B, and UV-C, or a non-coherent solid-state ultraviolet diode array providing UV radiation. By way of example, a low power irradiation apparatus in accordance with the present invention may configure the irradiation source 102 as a hexagonal 40 diode array emitting 400 mW of light placed at a 1 cm$^2$ square aperture such as in the UV range. A high power apparatus source may be a well-known ten-inch long six-kilowatt microwave electrodeless discharge bulb of the type manufactured by the assignee which emits UV and is placed at the focus of a cylindrical reflector with a parabolic cross section (not illustrated) of the radiation source 102. UV may be emitted through a rectangular aperture of dimensions of 265 by 195 mm.

The 106 beam is made quasi-coherent by breaking it into wavelets. This is accomplished by passing the beam through an array of pinholes, narrow slits, or tubes 110 which are illustrated only schematically. This function can also be accomplished by reflection off of a finely facetted mirror (not illustrated). A plate 108 with pinholes, narrow slits, or tubes 110 is illustrated as one possible methodology to make the beam quasi coherent.

At least one hologram 112 is placed in the beam projected by the radiation source 102. The at least one hologram 112 modifies the profile of the beam by modifying the phase of each wavelet produced by the pinholes, narrow slits, or tubes 110 or any other suitable optical collimation structures which make the beam quasi-coherent. The superposition of wavelets satisfies the condition that the variation in the irradiance between any two points on the at least one surface 113 of the 3D object 114 is minimized and preferably made substantially as uniform as possible. The irradiance is a projection of the radiance onto the at least one surface 113 and for the case of a light beam 106 from an isotropic point source 102 is a function of the shape of the surface if that surface differs from that of a sphere centered on the source. In accordance with the present invention, the light source 102 projects the beam 106 whose wavefronts can be approximated by wavelets (Huygens' Principle). The at least one holographic element 112 modifies the phase of each wavelet of the beam 106 and when the wavelets are superimposed to create a new wavefront at an arbitrary point, the resulting wavefront is modified. The irradiance is the projection of the shape of the object 114 onto a plane perpendicular to the optical axis 38 defined by the light source 102, wavelet forming structure 110 and, the at least one hologram 112 and the 3D object 114. In accordance with the present invention, the planar wavefronts are modified into complex wavefronts 116 whose projection onto the at least one surface 113 of the 3D object 114 results in a smaller variation in the irradiance between any two points on the at least one surface of the 3D object 114 with the objective being to cause variation in the irradiance of the at least one surface 113 to be as small as possible.

The at least one hologram 112 employed in the present invention is a photographically recorded plate containing an interference pattern generated by the interaction of semi-monochromatic radiation scattered from the target object and a coherent reference wave. This photographic plate contains by way of the fringe configuration, information about the amplitude and phase of the radiation wave scattered by the at least one surface 113 of the 3D object 114. The fringe configuration on the photographic plate can be made as a Fresnel hologram using the technique of E. Leith and J. Upatnieks in J. Opt. Soc. Am. 54, 1295 (1964), which is incorporated herein by, reference in its entirety. Holograms produced by this technique employ radiation sources with divergent beams like pinholes or facetted reflectors. The fringe configuration can also be recorded using the Fourier transform method as described by G. W. Stroke and D. Falconer, Phys. Lett., 15, 238 (1965) which is incorporated herein by its entirety and employs radiation sources whose beams consist of plane waves. Lasers usually project beams whose waves are planar. Light from small sources like pinholes can also be considered planar in far field. In one embodiment of present invention, a mask is used to block the output of the source except for a small area that can be considered as a source of quasi-planar wave front in the far field. This quasi-planar light is used to expose the holographic medium and process the hologram using methods well known in the prior art. A better approximation of the uniform light distribution can be achieved by multiple exposures of the holographic medium using sources achieved by sequential masking of several subsequent portions of the light source. An equivalent method more appropriate for the industrial application uses a mask with multiple apertures (or pin holes) for a simultaneous exposure of the holographic medium. There are many additional configurations of light sources, optical devices, and optical paths that can be used to record the fringe patterns on the holographic medium needed for the production of desirable irradiance of the at least one surface 113 of the 3D object 114 in accordance to the present invention. The holographic medium can be any material known to those skilled in the art for capturing the image of the interference fringes over the required, energy, wavelength or power level of the source beam.

The holographic or diffractive optical element can also be computed using a theory of holography or diffractive optics as, for example, discussed in F. Wyrowski, Appl. Opt. 31, 2253 (1989), O. Bryngdahl and F. Wyrowski, Digital Holography.-Computer Generated Holograms, in Progress in Optics XXVIII, E. Wolf, ed., 1-86 North-Holland, N.Y. (1990) and J. Jiang, "Rigorous Analysis and Design of Diffractive Elements, Thesis, The University of Alabama at Huntsville, (2000) which are incorporated herein by reference in their entirety. A common method for computing diffractive optical elements (DOEs) is called the Iterative Fourier Transform Algorithm (IFTA) as discussed by Bryngdahl and Wyrowski above.

The process of computing the pattern of the at least one holographic or diffractive optical element 112, is described in FIG. 5. The algorithm starts at starting point 500 at the point labeled "Start". The algorithm of the embodiment of the present invention using digital hologram FIG. 4, 100, computes a digital or functional representation of the interference pattern obtained between a radiation beam whose initial radiance distribution is that of the source and a radiation beam whose final radiance distribution is the desired radiance distribution at the 3D object FIG. 4 114. The process proceeds from start point 500 to point 502 where the Source Radiance Distribution is entered. The Source Radiance Distribution is a representation of the intensity and direction of radiation emitted by the source from a plurality of points across the source after propagation to the position of the diffractive optical element. The Desired Radiance Distribution is input at point 504. It is a representation of the desired intensity and direction of radiation at a plurality of points on the at least one surface 113 of 3D target 114 of FIG. 4 after reverse propagation to the position of the diffractive optical element. The required data sets input at points 502 and 504 are passed to point 506 where fast Fourier transforms are performed on each data set using digital techniques. See, C. S. Burrus and T. W. Parks, "DFT/FFT—Convolution Algorithms", John Wiley and Sons, New York, 1985 which is incorporated herein by reference in its entirety. The Fourier transforms of the data sets are passed to point 508 where a ratio is computed which is represented by the division of the Fourier transform of the source data entered at point 502, into the Fourier transform of the desired radiance data entered at point 504. This ratio represents the interference of the two beams previously discussed and the interference pattern is the hologram. The ratio is passed to point 510 where the ratio is scaled so that its dynamic range is expressed as percent transmission (i.e. is a value between zero and 100). The percent transmission is passed to point 512 where the result is written to a file for use in constructing the holographic element 112 of FIG. 4. The process then proceeds to stop point 514.

Figure 6B:
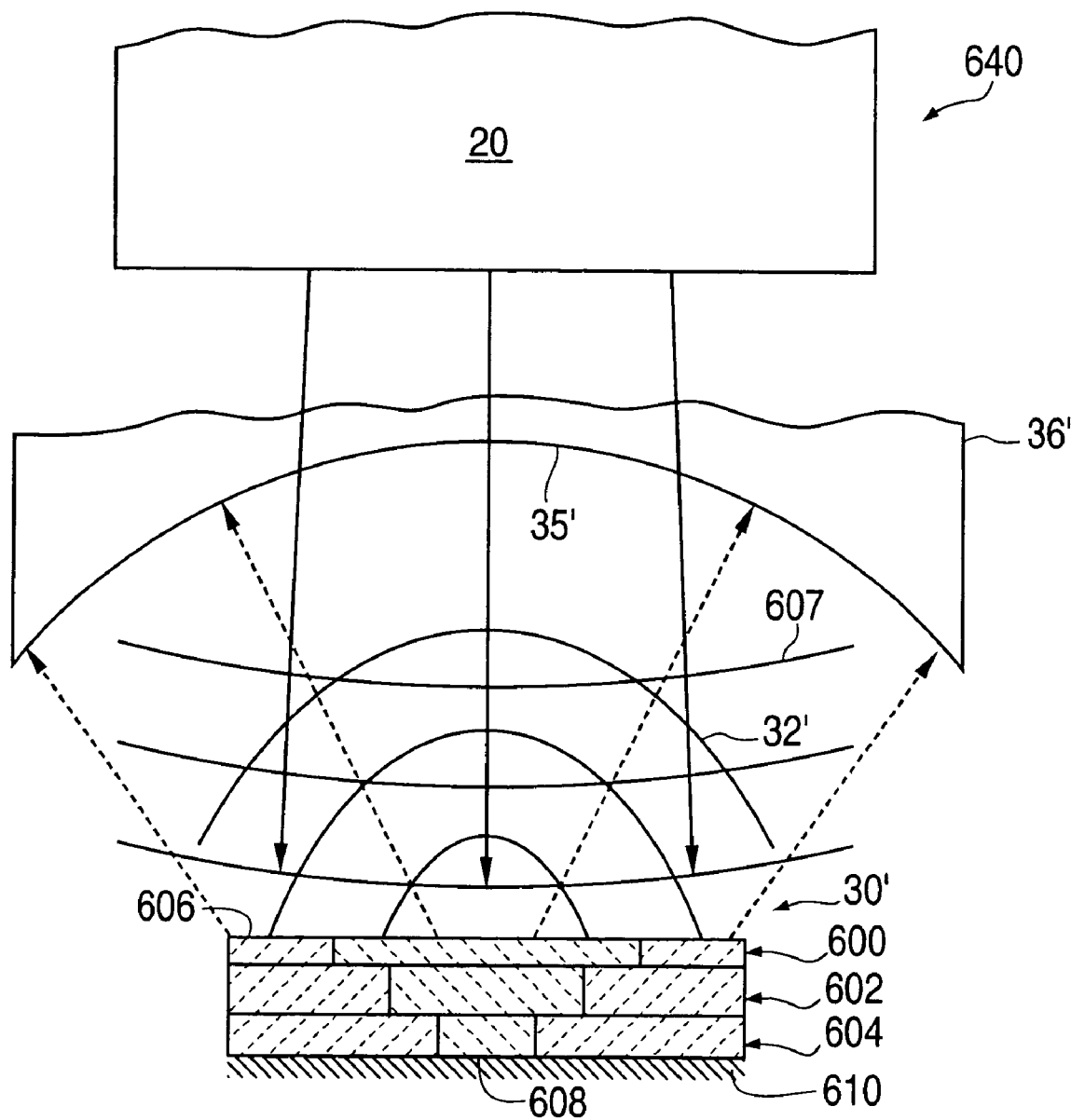

FIGS. 6A and 6B respectively illustrate further embodiments 620 and 640 of the invention using at least one optical element 30' which respectively work using the principle of transmission and reflection. The at least one optical element 30' of FIG. 6A is comprised of overlapping layers 600, 602 and 604 of different thickness which are each optically transmissive materials such as glass. Each of the layers 600, 602 and 604 is comprised of peripheral segments 606 of a higher index of refraction and center segments 608 of a lower index of refraction. However, the at least one optical element 30' is not limited to the number or thickness of layers, segments with only two indices of refraction and to the spatial configuration of segments with higher indices of refraction being outboard. The choice of the material thickness and the individual index of refraction of the segments is made to produce the desired aberration. The incident light wave front 607 passes through the at least one optical element 30' where it is refracted into a modified wave front 32' having the desired aberrations to produce a new more uniform irradiance determined for the at least one surface 35' of the 3D object 36'. The reflective embodiment 640 of FIG. 6B operates in a similar manner to the refractive embodiment 620 of FIG. 6A to produce the desired aberrations except that the incident wavefront 607 after passing through the at least one optical element 30', which may have an identical construction or vary from the optical element 30' of FIG. 6A, is reflected by a back surface mirror 610 which causes the resultant reflected output light beam 32' to have aberrations which produce a more uniform irradiance of the at least one surface 35' of the 3D object 36' for the applications described above. In FIG. 6B, the 3D object 36' may be positioned below or above the at least one optical element 30' so that the reflected light 32' does not strike the light source.

Figure 7:
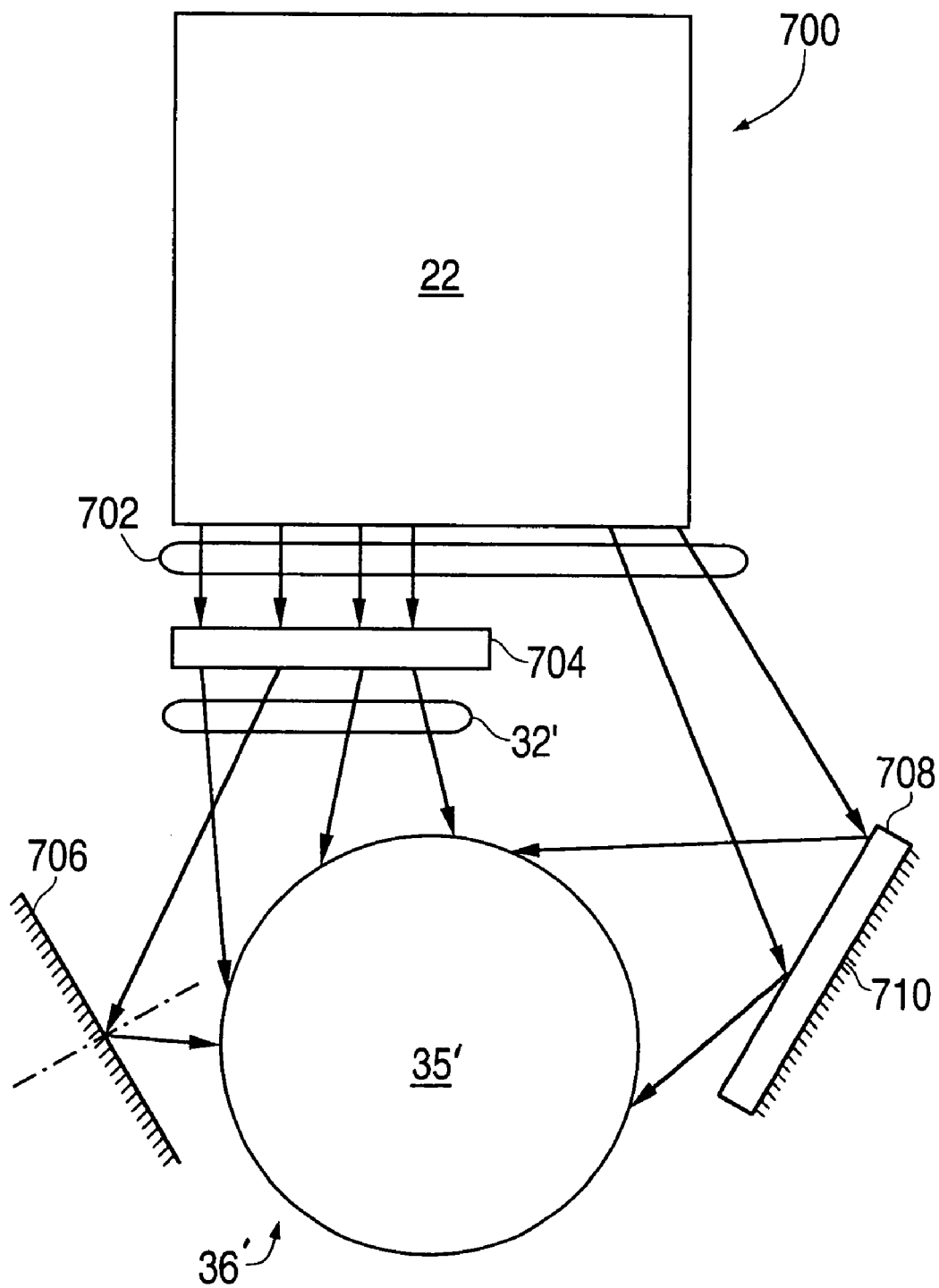
FIG. 7 is a schematic of a further embodiment which uses at least one optical element lens including transmissive and reflective lenses as the optical elements which modifies the flux produced by the light source and a mirror that reconfigures the light flux transmitted by the lens to irradiate at least one surface of the object.

FIG. 7 illustrates another embodiment 700 of the invention operating in a similar manner as the embodiment 20 of FIG. 1 except that a combination of transmissive and reflective lenses are utilized to modify the light flux produced by the light source 22 to produce a more uniform irradiance. The light output 702 from the light source 22 passes through a transmissive lens 704, which has been produced in accordance with the process discussed above in conjunction with FIG. 3, to modify the light flux in a manner similar to the light flux 70 of FIG. 2 being modified into the light flux 80. The modified light flux 32' strikes mirror 706 and is reflected to irradiate at least one surface 35' of the 3D object 36'. Additionally, a refractive lens element 708 is provided with a silvered mirror back surface 710 to produce a combination of refraction and reflection to irradiate the at least one surface 35' of the 3D object 36'. The lens element 708 is produced in accordance with the process of FIG. 3. The embodiment 700 relies upon a combination of refraction and reflection to irradiate the at least one surface 35 of the 3D object 36 with a more uniform irradiance and preferably with an irradiance which is substantially uniform for the applications of the invention as described above.

While the invention has been described with reference to its preferred embodiments, it should be understood that numerous modifications might be made thereto without departing from the spirit and scope of the appended claims. It is intended that all such modifications fall within the scope of the appended claims.

What is claimed is:

1. A method of irradiating at least one surface of a three-dimensional object with a desired ultraviolet light flux produced by an ultraviolet light source comprising:
   - determining a position at which the three-dimensional object will be positioned relative to the ultraviolet light source when the at least one surface is to be irradiated with the desired ultraviolet light flux;
   - determining an unmodified ultraviolet light flux which would irradiate the at least one surface when the ultraviolet light source is activated while the three-dimensional object is at the position relative to the ultraviolet light source;
   - producing an optical element, based upon the unmodified ultraviolet light flux and the desired ultraviolet light flux, which provides a modified wavefront of the ultraviolet light flux produced by the ultraviolet light source and which optical element, if positioned in a path of the wavefront of the ultraviolet flux to the at least one surface, would cause the modified wavefront to irradiate the at least one surface with the desired ultraviolet light flux;
   - positioning the optical element in the path which the wavefront of the ultraviolet light from the ultraviolet light source would follow in irradiating the at least one surface; and
   - activating the ultraviolet light source to transmit the ultraviolet light flux from the ultraviolet light source to the optical element to cause irradiation of the at least one surface with the desired ultraviolet light flux.

2. A method in accordance with claim 1 wherein:
   the desired light flux produces a substantially uniform irradiance on the at least one surface.

3. A method in accordance with claim 2 wherein:
   the irradiation of the at least one surface cures a surface coating thereon.

4. A method in accordance with claim 1 wherein:
   the irradiation of the at least one surface oxidizes the at least one surface.

5. A method in accordance with claim 1 wherein:
the irradiation of the at least one surface oxidizes at least one layer coated on the at least one surface.

6. A method in accordance with claim 1 wherein:
the irradiation of the at least one surface disinfects the at least one surface.

7. A method in accordance with claim 1 wherein:
the irradiation of the at least one surface decontaminates the at least one surface.

8. A method in accordance with claim 1 wherein:
the ultraviolet light source is a plasma discharge lamp providing UV radiation in a desired wavelength range.

9. A method in accordance with claim 2 wherein:
the ultraviolet light source is a plasma discharge lamp providing UV radiation in a desired wavelength range.

10. A method in accordance with claim 3 wherein:
the ultraviolet light source is a plasma discharge lamp providing UV radiation in a desired wavelength range.

11. A method in accordance with claim 4 wherein:
the ultraviolet light source is a plasma discharge lamp providing UV radiation in a desired wavelength range.

12. A method in accordance with claim 5 wherein:
the ultraviolet light source is a plasma discharge lamp providing UV radiation in a desired wavelength range.

13. A method in accordance with claim 6 wherein:
the ultraviolet light source is a plasma discharge lamp providing UV radiation in a desired wavelength range.

14. A method in accordance with claim 7 wherein:
the ultraviolet light source is a plasma discharge lamp providing UV radiation in a desired wavelength range.

15. A method in accordance with claim 1 wherein:
the ultraviolet light source is a non-coherent solid-state ultraviolet diode array providing the desired ultraviolet light flux.

16. A method in accordance with claim 2 wherein:
the ultraviolet light source is a non-coherent solid-state ultraviolet diode array providing the desired ultraviolet light flux.

17. A method in accordance with claim 3 wherein:
the ultraviolet light source is a non-coherent solid-state ultraviolet diode array providing the desired ultraviolet light flux.

18. A method in accordance with claim 4 wherein:
the ultraviolet light source is a non-coherent solid-state ultraviolet diode array providing the desired ultraviolet light flux.

19. A method in accordance with claim 5 wherein:
the ultraviolet light source is a non-coherent solid-state ultraviolet diode array providing the desired ultraviolet light flux.

20. A method in accordance with claim 6 wherein:
the ultraviolet light source is a non-coherent solid-state ultraviolet diode array providing the desired ultraviolet light flux.

21. A method in accordance with claim 7 wherein:
the ultraviolet light source is a non-coherent solid-state ultraviolet diode array providing the desired ultraviolet light flux.

22. A method in accordance with claim 1 wherein:
the optical element is a lens that reconfigures the ultraviolet light flux transmitted from the ultraviolet light source to the at least one surface.

23. A method in accordance with claim 2 wherein:
the optical element is a lens that reconfigures the transmitted ultraviolet light flux transmitted from the ultraviolet light source to the at least one surface.

24. A method in accordance with claim 3 wherein:
the optical element is a lens that reconfigures the transmitted energy distribution ultraviolet light flux transmitted from the ultraviolet light source to the at least one surface.

25. A method in accordance with claim 4 wherein:
the optical element is a lens that reconfigures the transmitted energy distribution ultraviolet light flux transmitted from the ultraviolet light source to the at least one surface.

26. A method in accordance with claim 5 wherein:
the optical element is a lens that reconfigures the transmitted energy distribution ultraviolet light flux transmitted from the ultraviolet light source to the at least one surface.

27. A method in accordance with claim 6 wherein:
the optical element is a lens that reconfigures the transmitted energy distribution ultraviolet light flux transmitted from the ultraviolet light source to the at least one surface.

28. A method in accordance with claim 7 wherein:
the optical element is a lens that reconfigures the transmitted energy distribution ultraviolet light flux transmitted from the ultraviolet light source to the at least one surface.

29. A method in accordance with claim 1 wherein:
the optical element comprises overlapping layers of a variable index of refraction lens material with at least two layers having a different index of refraction.

30. A method in accordance with claim 1 wherein:
the optical element comprises overlapping layers of a lens material of different thickness and having a different index of refraction.

31. A method in accordance with claim 1 wherein:
the optical element is a lens which modifies the light flux produced by the ultraviolet light source and a mirror that reconfigures light flux transmitted by the lens to irradiate the at least one surface with the desired ultraviolet light flux.

32. A method in accordance with claim 1 wherein:
the optical properties of a lens and mirror are determined by using a ray tracing methodology.

33. A method in accordance with claim 1 wherein:
the optical element comprises lens material bonded to the at least one mirror.

34. A method in accordance with claim 1 wherein:
the optical element comprises at least one hologram through which the wavefront passes and the at least one ultraviolet light source is non-coherent.

35. A method in accordance with claim 1 wherein:
the at least one optical element is at least two holograms through which the wavefront passes and the at least one non-coherent ultraviolet light source radiates two or more wavelengths.

36. A method of irradiating at least one surface of a three-dimensional object with a desired light flux produced by an light source comprising:
determining a position at which the three-dimensional object will be positioned relative to the light source when the at least one surface is to be irradiated with the desired light flux;
determining an unmodified light flux which would irradiate the at least one surface when the light source is activated while the three-dimensional object is at the position relative to the light source;
producing an optical element, based upon the unmodified light flux and the desired light flux, which provides a modified wavefront of the light flux produced by the light source and which optical element, if positioned in a path of the wavefront of the flux to the at least one surface, would cause the modified wavefront to irradiate the at least one surface with the desired light flux;

positioning the optical element in the path which the wavefront of the light from the light source would follow in irradiating the at least one surface; and activating the light source to transmit the light flux from the light source to the optical element to cause irradiation of the at least one surface with the desired light flux.

37. A method in accordance with claim 36 wherein:

the desired light flux produces a substantially uniform irradiance on the at least one surface.

38. A method in accordance with claim 36 wherein:

the optical element is a lens that reconfigures the light flux transmitted from the light source to the at least one surface.

39. A method in accordance with claim 36 wherein:

the optical element comprises overlapping layers of a different index of refraction lens material with at least two layers having a different index of refraction.

40. A method in accordance with claim 36 wherein:

the optical element is a lens which modifies the light flux produced by the light source and a mirror that reconfigures light flux transmitted by the lens to irradiate the at least one surface with the desired light flux.

41. A method in accordance with claim 36 wherein:

the optical element comprises at least one hologram through which the wavefront passes and the at least one light source is non-coherent.

* * * * *

UNITED STATES PATENT AND TRADEMARK OFFICE
CERTIFICATE OF CORRECTION

PATENT NO. : 6,967,342 B2
DATED : November 22, 2005
INVENTOR(S) : Ruckman et al.

It is certified that error appears in the above-identified patent and that said Letters Patent is hereby corrected as shown below:

Column 14,
Line 57, "an light" should read -- a light --.

Signed and Sealed this

Twenty-third Day of May, 2006

JON W. DUDAS
*Director of the United States Patent and Trademark Office*